US007031264B2

(12) United States Patent
Adhikari et al.

(10) Patent No.: US 7,031,264 B2
(45) Date of Patent: Apr. 18, 2006

(54) DISTRIBUTED MONITORING AND ANALYSIS SYSTEM FOR NETWORK TRAFFIC

(75) Inventors: Akshay Adhikari, Bernardsville, NJ (US); Scott Vincent Bianco, Suffern, NY (US); Lorraine Denby, Berkeley Heights, NJ (US); Colin L. Mallows, Flemington, NJ (US); Jean Meloche, Madison, NJ (US); Balaji Rao, Basking Ridge, NJ (US); Shane M. Sullivan, Plano, TX (US); Yehuda Vardi, Watchung, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 162 days.

(21) Appl. No.: 10/459,948

(22) Filed: Jun. 12, 2003

(65) Prior Publication Data

US 2004/0252646 A1 Dec. 16, 2004

(51) Int. Cl.
*H04L 12/56* (2006.01)

(52) U.S. Cl. ....................................... 370/252; 370/408

(58) Field of Classification Search ............. 370/352.1, 370/252, 241.1, 242, 247, 236.2, 236.1, 235, 370/237, 238, 248, 255, 241, 229, 231, 238.1, 370/253, 389, 351–358, 393, 383, 256, 386, 370/408, 216

See application file for complete search history.

(56) References Cited

U.S. PATENT DOCUMENTS 4,947,390 A * 8/1990 Sheehy ....................... 370/401
5,450,394 A * 9/1995 Gruber et al. .............. 370/253
6,363,065 B1 3/2002 Thornton et al.
6,442,615 B1 * 8/2002 Nordenstam et al. ....... 709/241

(Continued)

FOREIGN PATENT DOCUMENTS

EP 1 372 326 A2 12/2003

(Continued)

OTHER PUBLICATIONS

U.S. Appl. No. 10/261,431, filed Sep. 30, 2002, “Communication System Endpoint Device with Integrated Call Synthesis Capability.”

(Continued)

*Primary Examiner*—Brenda Pham
(74) *Attorney, Agent, or Firm*—Ryan, Mason & Lewis, LLP

(57) ABSTRACT

Techniques are disclosed for improved monitoring and analysis of VoIP communications, multimedia communications or other types of network traffic in a network-based communication system. In accordance with one aspect of the invention, endpoint devices of the network-based communication system are configurable so as to collectively implement a distributed monitoring and analysis system which does not require a centralized testing server or other centralized controller. Distributed test units associated with the endpoint devices may be utilized in implementing the distributed monitoring and analysis system, and are preferably configured to support a web-based user interface providing access to measurement data. The endpoint devices may be advantageously organized into a hierarchy comprising a plurality of zones, with each of the endpoint devices belonging to at least one zone. For each zone, one of the endpoint devices may be designated as a zone leader for controlling the periodic generation of communications between selected endpoint devices that belong to subzones of that zone in the hierarchy.

27 Claims, 3 Drawing Sheets

ENDPOINT DEVICE 102-1
DISTRIBUTED TEST UNIT 104-1
100
ENDPOINT DEVICE 102-2
NETWORK 106
ENDPOINT DEVICE 102-3
ENDPOINT DEVICE 102-M

TOP ZONE ROOT
SUBZONE X Y
SUBSUBZONE X.1 X.2 Y.1 Y.2 Y.3
E1 E2 E3 E4 E5 E6 E7 E8 E9

U.S. PATENT DOCUMENTS

| | | | | |
|---|---|---|---|---|
| 6,728,261 | B1 * | 4/2004 | Sasson et al. | 370/466 |
| 6,795,431 | B1 * | 9/2004 | Endo | 370/352 |
| 2002/0101860 | A1 | 8/2002 | Thornton et al. | |
| 2003/0048812 | A1 | 3/2003 | Gross | |
| 2003/0214913 | A1 * | 11/2003 | Kan et al. | 370/252 |

FOREIGN PATENT DOCUMENTS

| | | |
|---|---|---|
| EP | 04 25 3460 | 8/2004 |

OTHER PUBLICATIONS

"Omegon Unveils NetAlly Solution; Industry-First Fully Active Service Quality Assurance Platform Assures Customers Unprecedented Levels of Network Availability and Reliability," http://www.itsecurity.com/tecsnews/sep2000/sep517.htm, pp. 1-3, Sep. 2000.

"Chariot VoIP Assessor Version 1.0," http://www.tmcnet.com/it/0302/0302labs5.htm, pp. 1-4, Mar. 2002.

"VoIP Management and Newtork Testing," http://www.netiq.com/solutions/voip/default. asp, pp. 1-3, 2002.

"Chariot," http://www.netiq.com/products/chr/, pp. 1-2, 2002.

"VoIP Test Module for Chariot," http://www.netiq.com/products/chr/voipmodule.asp, pp. 1-2, 2002.

Telchemy, Inc., "Monitoring Voice Quality in Voice Over IP Networks," 3 pages, 2001.

Telchemy, Inc., "Bringing Intelligence to Networks," http://www.telchemy.com/, pp. 1-5, 2001.

Viola Networks, "NetAlly® VoIP—VoIP Readiness Testing and Deployment," http://www.omegon.com/netally_voip.asp, pp. 1-4, 2002.

Moshe Sidi et al., "Converged Network Performance Verification and e-Support Using NetAlly®," Omegon Networks Ltd., pp. 1-13, Jun. 2001.

Moshe Sidi, "Reality-based VoIP Readiness Testing using NetAlly® VoIP," Viola Networks, pp. 1-10, Apr. 2002.

Moshe Sidi, "Readying Your Network for VoIP: Get it Right the First Time," Viola Networks, pp. 1-9, Apr. 2002.

J.Q. Walker, "A Handbook for Successful VoIP Deployment:Network Testing, QoS, and More," NetIQ Corporation, pp. 1-13, 2002.

"NetIQ Vivinet Diagnostics," http://www.netiq.com/products/vd/default.asp, pp. 1-2, 1993-2003.

"NetIQ—Checklist of VoIP Network Design Tips," NetIQ Corporation, 3 pages, 2002.

Brix Networks, "Library," http://www.brixnet.com/library/library_register.cfm, 1 page, 2003.

Brix Networks, "The Brix System," http://www.brixnet.com/products/products_overview.html, 1 page, 2003.

* cited by examiner 100
102-1
ENDPOINT DEVICE
104-1
DISTRIBUTED TEST UNIT
106
NETWORK
102-2
ENDPOINT DEVICE
102-3
ENDPOINT DEVICE
102-M
ENDPOINT DEVICE 200
202
PROCESSOR
204
MEMORY
206
NETWORK INTERFACE(S)
TO/FROM NETWORK

| sessionid | seq | packet bitmap | s | u | v | pathlen | truepathlen | path | other content |

DISTRIBUTED MONITORING AND ANALYSIS SYSTEM FOR NETWORK TRAFFIC

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION(S)

The present application is related to U.S. patent application Ser. No. 10/460,700, filed concurrently herewith in the name of inventors A. Adhikari et al. and entitled "Method and Apparatus for Determination of Network Topology," the disclosure of which is incorporated by reference herein.

FIELD OF THE INVENTION

The invention relates generally to network monitoring and analysis systems, and more particularly to techniques for the monitoring and analysis of Voice over Internet Protocol (VoIP) communications, multimedia communications or other types of network traffic in a network-based communication system.

BACKGROUND OF THE INVENTION

A number of software-based systems are known in the art for the monitoring and analysis of VoIP networks. These include, by way of example, Chariot™ VoIP Assessor Version 1.0, commercially available from NetIQ Corporation of San Jose, Calif., and NetAlly™ VoIP, commercially available from Viola Networks of Somerset, N.J., formerly Omegon Ltd. Such systems typically monitor and analyze network-level VoIP performance in terms of quality of service (QoS) or compliance with service level agreements (SLAs), using packet-based measurements such as jitter, loss and delay.

Conventional monitoring and analysis systems such as those noted above exhibit a number of significant problems. One problem is that these conventional systems are often configured such that application-related effects can lead to mischaracterization of the actual contribution of the network to a given measurement. For example, the actual transmit time for sending out test traffic over the network in the conventional systems may be significantly delayed relative to its recorded transmit time if the endpoint device used to send the test traffic becomes busy with other processing tasks, thereby rendering the resulting measurements inaccurate.

Another problem relates to clock synchronization. Conventional techniques typically utilize a clock synchronization approach, in which the system attempts to synchronize the clocks of the endpoint devices used to perform a test, prior to taking any measurements involving those devices. Unfortunately, this approach is problematic in that clock synchronization takes an excessive amount of time, and thus unduly limits the responsiveness of the system to changing network conditions. Moreover, clock synchronization can fail altogether, since it depends on network conditions at the time the synchronization process is carried out, and these conditions may be unfavorable to accurate synchronization. Poor network conditions in a given segment of the network can preclude accurate synchronization of the associated devices, and as a result the system may be unable to analyze this network segment.

Other known network monitoring and analysis systems utilize a so-called "passive" approach which involves monitoring actual random call traffic over the network. This approach has very limited flexibility, in that it relies on actual call traffic generated by actual users rather than targeted traffic generated in accordance with specified test parameters.

The above-noted problems have been addressed recently by techniques described in U.S. patent application Ser. No. 10/261,431, filed Sep. 30, 2002 in the name of inventors M. J. Bearden et al. and entitled "Communication System Endpoint Device With Integrated Call Synthesis Capability," the disclosure of which is incorporated by reference herein.

Despite the considerable advantages provided by the techniques described in the above-cited U.S. patent application Ser. No. 10/261,431, a need remains for further improvements in network monitoring and analysis systems.

SUMMARY OF THE INVENTION

The invention provides techniques for improved monitoring and analysis of VoIP communications, multimedia communications or other types of network traffic in a network-based communication system.

In accordance with one aspect of the invention, a plurality of endpoint devices of the network-based communication system are configurable to provide a distributed monitoring and analysis system which in an illustrative embodiment does not require any centralized testing server or other type of centralized controller.

The illustrative embodiment includes distributed test units incorporated within, coupled to or otherwise associated with the respective endpoint devices. The distributed test units are utilized in implementing the distributed monitoring and analysis system, and are preferably also configured to support a web-based user interface providing user access via an otherwise conventional web browser to measurement data gathered by the system. Such measurement data may include analysis results based on processing of measured QoS-related statistics.

In accordance with another aspect of the invention, the endpoint devices may be organized into a hierarchy comprising a plurality of zones, with each of the plurality of endpoint devices belonging to at least one zone. For each zone, one of the endpoint devices may be designated as a zone leader for controlling the periodic generation of communications between selected endpoint devices that belong to subzones of that zone in the hierarchy.

Advantageously, the invention allows accurate measurements of jitter, loss, delay and other QoS-related statistics to be determined in a distributed manner without the need for a centralized controller.

DETAILED DESCRIPTION OF THE INVENTION

Figure 1:
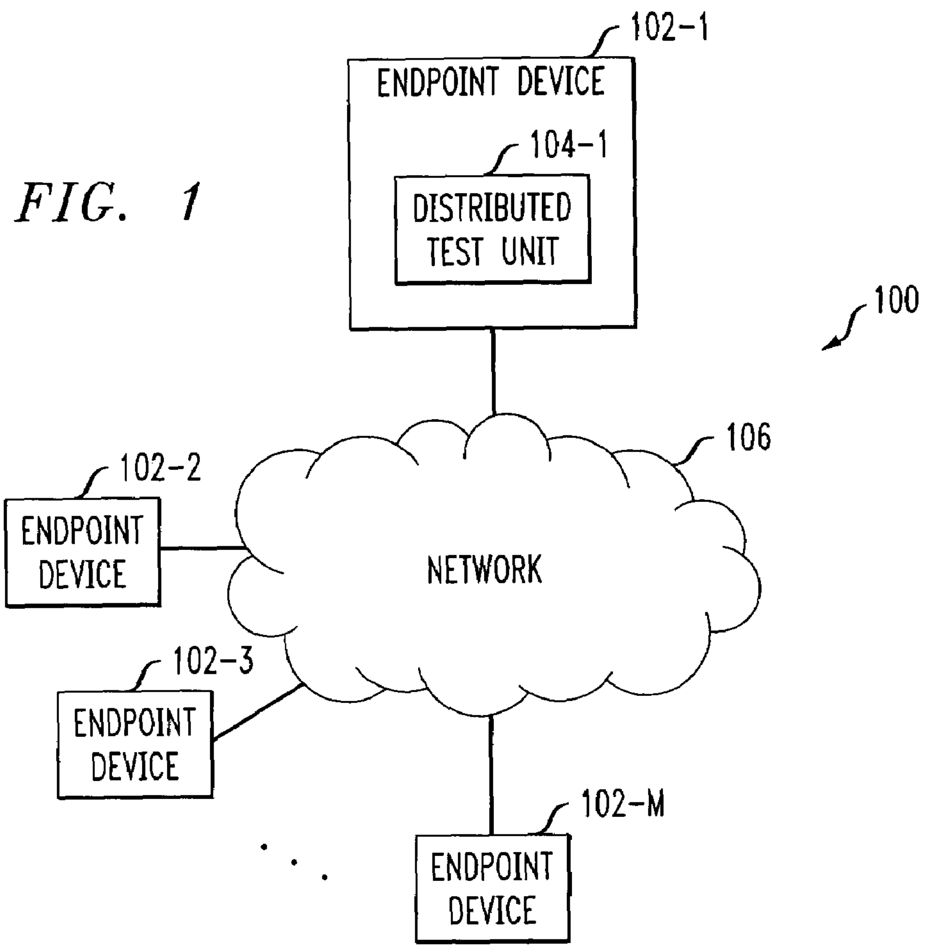
FIG. 1 shows an exemplary communication system in which the invention is implemented.

The invention will be illustrated below in conjunction with an exemplary communication system suitable for supporting Internet telephony applications. It should be understood, however, that the invention is not limited to use with any particular type of communication system or configuration of endpoint devices or other system elements. Those skilled in the art will recognize that the disclosed techniques may be used in any communication application in which it is desirable to provide improved monitoring and analysis of Internet protocol (IP) communications or other types of real-time or non-real-time network traffic in a network-based communication system.

Moreover, the invention, although particularly well-suited for use in monitoring and analysis of VoIP traffic, also provides significant advantages in multimedia traffic applications or other flow-based real-time applications in which it is desirable to understand end-to-end behavior attributable to a network.

The invention can thus be used with voice, video, multimedia or any other type of network traffic.

The term "packet" as used herein is intended to include not only IP packets but also other types of packets used in other packet-based communication systems.

The term "voice" as used herein is intended to include speech and other human-generated audio information, machine-generated audio information or combinations of these and other types of audio information. It should be noted that the invention is generally applicable to any type of audio information. The invention can also be applied to other types of signals, including facsimile signals, signaling tones, etc. As noted above, the invention can also be applied to multimedia traffic, as well as any other type of network traffic in a network-based system.

The term "call" as used herein is intended to be construed broadly so as to encompass Internet telephony communications, VoIP communications, Session Initiation Protocol (SIP) communications, multimedia communications, or other types of network traffic in a network-based communication system.

The terms "endpoint" and "endpoint device" are used interchangeably herein and are intended to include an origination or destination device associated with a given VoIP call or other type of communication in a network-based communication system.

It is to be appreciated that a given endpoint device therefore need not be a terminal device of the system, and may comprise an internal network element such as, for example, a gateway, a router, a switch, or any other type of non-terminal network element. A given pair of endpoint devices in the illustrative embodiment may be viewed generally as comprising the source and destination nodes of a particular communication path. An endpoint device may therefore be a device comprising or otherwise associated with any network node.

The term "measurement data" as used herein is intended to include jitter, loss, delay or other QoS-related statistics, associated analysis results determinable therefrom, as well as other types of data.

FIG. 1 shows an example network-based communication system 100 in which the present invention is implemented. The system 100 includes an arbitrary number M of endpoint devices 102-*i*, i=1, 2, . . . M, each of which includes or is otherwise associated with a corresponding distributed test unit 104-*i*. In addition, each of the endpoint devices 102 is coupled to or otherwise associated with a network 106. Although shown for simplicity of illustration as terminal endpoint devices in the figure, one or more of the endpoint devices 102, as indicated previously, may comprise or be otherwise associated with an internal node of network 106.

An illustrative embodiment of the invention as implemented in the network-based communication system 100 of FIG. 1 provides a distributed, hierarchical, real-time network monitoring and analysis system that is configured using the distributed test units 104 associated with endpoints 102. The system is utilizable in a wide variety of different monitoring and analysis applications, including pre-deployment or post-deployment testing for VoIP system implementation, blame attribution, admission control, and dynamic routing.

In the illustrative embodiment, the endpoints 102 are each equipped with hardware, firmware and software elements which comprise the corresponding distributed test unit 104 for providing the desired monitoring and analysis functionality.

Although the distributed test unit 104-1 is shown as being an element of the endpoint device 102-1 in the FIG. 1 embodiment, this is by way of example only. It is to be appreciated that one or more of the distributed test units may represent external units coupled to their respective endpoint devices, or may be otherwise associated with their respective endpoint devices. Moreover, different association arrangements may exist between different ones of the endpoint devices 102 and their respective distributed test units 104.

It should also be noted that a given endpoint device 102 may comprise only the distributed test unit while providing substantially no other functionality. The term "endpoint device" as used herein is therefore intended to include, by way of example, a stand-alone distributed test unit. In such an arrangement, the stand-alone distributed test unit may nonetheless be referred to as being "associated with" an endpoint device.

Moreover, a given distributed test unit may be incorporated within, coupled to or otherwise associated with a network element other than a terminal endpoint. For example, the distributed test unit may be incorporated within, coupled to or otherwise associated with an endpoint comprising a gateway, router or other internal element of the network.

As indicated above, the endpoint devices 102 are illustratively configurable via their respective distributed test units 104 so as to collectively provide a distributed network monitoring and analysis system in the network-based communication system 100. Advantageously, such an approach avoids the need for a testing server or other centralized controller for controlling the endpoint devices 102 to provide VoIP monitoring and analysis in the network-based communication system 100. Instead, the endpoint devices themselves are used to implement a distributed network monitoring and analysis system using the techniques of the invention, as will be described in detail below.

In addition, at least a subset of the distributed test units 104 in the illustrative embodiment are preferably configured to support a web-based user interface. A given user can therefore access one of the distributed test units 104 via the web-based user interface in order to obtain measurement data obtained by the distributed system. Other types of user interfaces may also be used in order to obtain measurement data, possibly including associated analysis results, from one or more of the distributed test units.

The distributed test units 104 associated with endpoint devices 102 of the system 100 may also be configured to utilize one or more of the kernel timestamping, timestamp post-processing or other techniques described in the above-cited U.S. patent application Ser. No. 10/261,431.

The endpoint devices 102 may be otherwise conventional wired or wireless IP telephones (including devices commonly referred to as IP "softphones"), personal digital assistants (PDAs), mobile telephones, personal computers (PCs), single-board computers (SBCs) or other types of processing devices, configured to support a distributed monitoring and analysis system in accordance with the invention.

It should be noted that the endpoint devices 102 are each typically configured to operate as both receiver and transmitter, as in the case of a bidirectional VoIP communication established between a given pair of endpoints.

Conventional aspects of such endpoint devices are well-known in the art and therefore not described in further detail herein.

One or more of the endpoint devices 102 may comprise so-called "synthetic" devices which generate test communications in the form of synthesized calls but are not configured for use in placing actual calls. Also, one or more of the endpoint devices may comprise devices suitable for use in placing actual calls and also capable of generating test communications in the form of synthesized calls. Additional details regarding devices of the latter type can be found in the above-cited U.S. patent application Ser. No. 10/261,431.

It is assumed for simplicity of description that each of the endpoints 102 in the system 100 is equipped with a distributed test unit 104. Subsequent references to endpoints 102 herein should be understood to refer to endpoints that are so equipped, unless otherwise noted. However, the system 100 can of course include numerous other endpoints that are not so equipped but instead operate in an entirely conventional manner.

Additional system elements, not shown in FIG. 1, may be coupled between each of the endpoints 102 and the network 106.

Network 106 may represent, e.g., a global communication network such as the Internet, a wide area network, a metropolitan area network, a local area network, a wireless cellular network, a public switched telephone network (PSTN), or a satellite network, as well as portions or combinations of these or other communication networks.

The network 106 may comprise conventional IP routers, gateways, switches or other packet processing elements. For example, the network may include a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc.

Standard protocols that are commonly utilized in VoIP communications include User Datagram Protocol (UDP), described in Internet Engineering Task Force (IETF) Request for Comments (RFC) 768, "User Datagram Protocol," August 1980, http://www.ietf.org/rfc/rfc768.txt, Real-Time Transport Protocol (RTP), described in IETF RFC 1889, "RTP: A Transport Protocol for Real-Time Applications," http://www.ietf.org/rfc/rfc1889.txt, and RTP Control Protocol (RTCP), described in IETF RFC 3158, "RTP Testing Strategies," August 2001, all of which are hereby incorporated by reference herein.

By way of example, VoIP communications may comprise RTP voice data packets that are sent over an IP network using UDP. More particularly, the RTP packets are encapsulated in UDP packets which are themselves encapsulated in IP packets.

Signaling protocols utilizable in conjunction with VoIP communications to provide functions such as call setup, teardown and dial tone include Session Initiation Protocol (SIP), described in IETF RFC 3261, "SIP: Session Initiation Protocol," June 2002, http://www.ietf.org/rfc/rfc3261.txt, International Telecommunication Union—Telecommunication Standardization Sector (ITU-T) Recommendation H.323, "Packet-based multimedia communication systems," November 2000, and ITU-T Recommendation H.225, "Call signaling protocols and media stream packetization for packet-based multimedia communication systems," November 2000, all of which are incorporated by reference herein.

VoIP communications in the context of the present invention may be implemented utilizing one or more of the above-cited protocols, or other suitable protocols, as will be readily apparent to those skilled in the art.

It should be emphasized that the simplified configuration of the system 100 as shown in FIG. 1 is for purposes of illustration only, and should not be construed as limiting the invention to any particular arrangement of elements. For example, the system 100 may include additional endpoints, comprising other types and arrangements of routing elements, switching elements or other types of processing elements.

Figure 2:
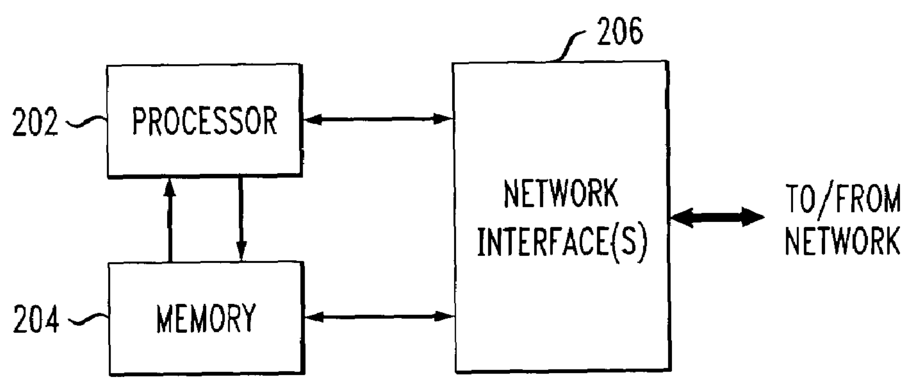
FIG. 2 is a simplified block diagram showing one possible implementation of an endpoint device or other processing element of the FIG. 1 system.

FIG. 2 shows one possible implementation of a given processing element 200 of the FIG. 1 system. The processing element 200 may represent, by way of example, at least a portion of one of the endpoint devices 102 having an internal distributed test unit 104, or at least a portion of an external distributed test unit 104 coupled to or otherwise associated with one of the endpoint devices 102.

The processing element 200 as shown in the figure includes a processor 202 coupled to a memory 204 and one or more network interfaces 206. The monitoring and analysis techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is considerably simplified for purposes of illustration. For example, if viewed as representative of a telephony terminal endpoint device, the processing element 200 may include conventional elements typically associated with such a device, such as codecs and other voice signal processing hardware or software elements.

In operation, at least first and second ones of the endpoint devices 102 are configurable via their respective distributed test units 104 to collectively implement a distributed monitoring and analysis system. The distributed monitoring and analysis system is operative to direct one or more communications between the first and second endpoint devices and to make measurements based on the communication(s). The distributed test units 104 are thus capable of interfacing with one another so as to synthesize calls between their respective endpoint devices and to make accurate measurements of jitter, loss, delay and other QoS-related statistics. Examples of measurements of this type are described in the above-cited U.S. patent application Ser. No. 10/261,431.

When attempting to generate a synthetic call, the originating endpoint device typically performs a call setup process to set up the call with a specified destination endpoint device, and then begins to send RTP packets with a predetermined payload. The call may involve an IP telephony gateway, call controller or other switch within or otherwise associated with the network. The predetermined payload may be randomly generated, derived from an actual voice recording, or otherwise configured to be suitably representative of actual voice data. During the call, QoS measurements are collected for the call traffic. The measurement collection may be performed in compliance with RTCP. At the end of the call, or at intervals during the call, the measurement data may be made available to a user via a web-based user interface supported by each of the distributed test units 104.

A more specific example implementation of the endpoints 102 in the illustrative embodiment will now be described in greater detail. In this implementation, it is assumed that the distributed test units 104 are incorporated into their respective endpoints utilizing hardware, firmware and software elements thereof to provide the desired monitoring and analysis functionality. It is to be appreciated that the particular hardware, firmware and software elements described below are merely examples, and those skilled in the art will recognize that numerous alternative arrangements may be used in implementing the present invention.

The hardware element in this example may comprise a single-board computer, such as the Developer Board LX commercially available from Axis Communications AB, Lund, Sweden, configured to include a network interface for interfacing to the network 106.

Figure 3:
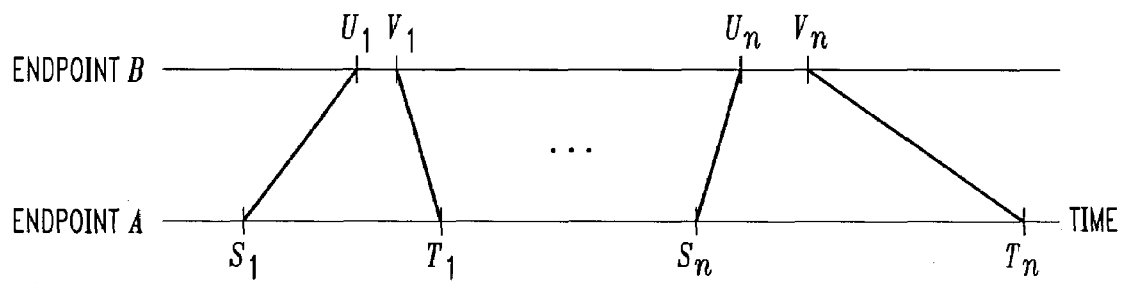
FIGS. 3 and 4 illustrate timestamp processing aspects of the invention.

The firmware element may be in the form of an operating system kernel which is configured to generate timestamps having a sufficient level of precision. For example, proper monitoring and analysis of a given packet i traveling from an endpoint A to an endpoint B and back to endpoint A will generally require the generation of the following four timestamps:

$S_i$=departure time for packet i from A $T_i$=arrival time for packet i on A $U_i$=arrival time for packet i on B $V_i$=departure time for packet i from B FIG. 3 provides a graphical depiction of these timestamps for a set of n packets. The timestamps may be analyzed in order to partition the packet round trip time into its component delays.

The operating system kernel is preferably configured to generate the timestamps with an amount of precision sufficient to ensure that the entirety of the difference measures $U_i-S_i$ and $T_i-V_i$ are attributable to network delays rather than to factors within the endpoint itself. For example, a high activity load on a given endpoint should not affect these difference measures. In addition, the analysis of the difference measures for a sequence of packets can reveal both the offset and the drift between their internal clocks, more are more specifically defined herein as follows:

δ=offset of clock of endpoint B relative to A

ρ=drift of clock of endpoint B relative to A

Time measured on endpoint B should be transformed, preferably in a linear manner using the above-noted δ and ρ parameters, so as to be on the same scale as time on endpoint A. In other words, $$t \mapsto \delta+\rho t$$

where δ and ρ are a priori unknown, and thus need to be estimated. This estimation can be carried out in the following manner. It is known, by construction, that for all i, $$S_i<\delta+\rho U_i<\delta+\rho V_i<T_i$$

or, equivalently $$\delta<T_i-\rho V_i \quad 1 \leqq i \leqq n$$

$$\delta>S_i-\rho U_i \quad 1 \leqq i \leqq n$$

This may also be expressed as follows:

$$\max_{1\le i\le n}\{S_i-\rho U_i\}<\delta<\min_{1\le i\le n}\{T_i-\rho V_i\}$$

Let $$D=\left\{(\delta,\rho) \ni \max_{1\le i\le n}\{S_i-\rho U_i\}<\delta<\min_{1\le i\le n}\{T_i-\rho V_i\}\right\}$$

Note that any of the points in D corresponds to a linear adjustment of time on endpoint B which is consistent with the order in which all of the 4×n time stamps $S_i$ $U_i$ $V_i$ $T_i$ were collected. Also, if time on B progresses on a linear fashion relative to time on A, then D is not empty. Finally, note that D is a convex set and that if (δ,ρ)∈D then so is $$\left(\frac{1}{2}[\max\{S_i-\rho U_i\}+\min\{T_i-\rho V_i\}],\ \rho\right)$$

Accordingly, the offset and drift may be estimated as $(\hat{\delta}, \hat{\rho})$ where $$\hat{\rho}=\frac{1}{2}\{\hat{\rho}_L+\hat{\rho}_H\}$$

$[\hat{\rho}_L+\hat{\rho}_H]$ is the projection of $D$ on the $\rho$ axis and $$\hat{\delta}=\frac{1}{2}\{\max\{S_i-\hat{\rho}U_i\}+\min\{T_i-\hat{\rho}V_i\}\}$$

Figure 4:
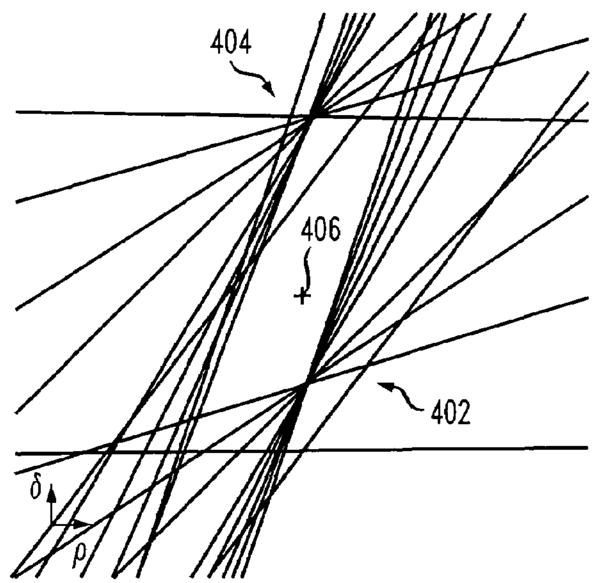

FIG. 4 shows the convex set D and the 20 lines that define it for the 4×10=40 timestamps in this example. The horizontal axis is ρ and the vertical axis is δ. The set D must lie above all ten lines ($\delta>S_i-\rho U_i$ $1 \leqq i \leqq 10$) denoted generally by reference numeral 402, and below all ten lines ($\delta<T_i-\rho V_i$ $1 \leqq i \leqq 10$) denoted generally by reference numeral 404. The cross 406 in the figure marks the location of the above-described estimate $\hat{\rho},\hat{\delta}$.

Appendix 1 below shows an exemplary set of code in the Python programming language that transforms a sequence of timestamps $S_i$ $U_i$ $V_i$ $T_i$ into a corresponding sequence of timestamps for which $U_i$ and $V_i$ have been put on the endpoint A time scale. It is to be appreciated that this code is merely illustrative of one aspect of a possible embodiment of the invention, and should not be construed as limiting the scope of the invention in any way.

The software element of the example implementation of endpoints 102 in the illustrative embodiment will now be described in greater detail. This software element is generally configured so as to obtain measurements of jitter, loss, delay and other QoS-related statistics. As indicated above, such measurements may be utilized in applications such as pre-deployment or post-deployment testing for VoIP system implementation, blame attribution, admission control, and dynamic routing.

It may be desirable to arrange the endpoints 102 having distributed test units 104 at certain predetermined strategic locations throughout the network in order to ensure that a sufficient level of monitoring and analysis can be achieved for a given application. The resolution of the monitoring and analysis process depends on factors such as the network topology, the number of paths through the network, and the number and location of the endpoints 102.

In operation, the endpoints 102 place synthetic calls to one another such that streams of data traffic are generated and sent across the network. For example, the traffic associated with a given synthetic call may originate from endpoint A, and subsequently reach endpoint B which sends it back to A. As the packets in the stream travel, timestamps are collected and network QoS-related statistics are derived.

The endpoints 102 may be configured to implement an address discovery process. For example, a given one of the endpoints 102 can be configured to seek an address at boot time using the Dynamic Host Configuration Protocol (DHCP). This is the preferred way to populate a network with a large number of endpoints 102 because the alternative, a static and manual configuration of IP addresses, quickly becomes difficult to manage as the number of endpoints increases.

When DHCP is used, the address range in which the endpoint has been installed is determined and then a discovery program implemented as part of the software element is used to find the particular address in that range that the endpoint has received. This discovery program in a given one of the endpoints looks for other endpoints having the same distributed test unit capability by probing a UDP port at each of the addresses in the union of all the address ranges that are known to contain at least one endpoint. The discovery program generally must execute at a given endpoint before any monitoring or any analysis can take place involving that endpoint.

As a possibly large number of addresses may need to be probed, the work of address discovery is preferably divided among the available endpoints. Starting with one endpoint, the remaining search space is divided in two as soon as one endpoint is found. This binary division of remaining search space may be used every time a new endpoint is discovered, resulting in a near-optimal use of the available searching resources as they are found. An optimal scheme would take into account the case where an endpoint reaches the end of its search task before its peers. However, the improvement that this optimal case represents may not justify the added data management complexities in a given application.

Additional details regarding network topology determination techniques utilizable in conjunction with the present invention are described in the above-cited U.S. patent application Ser. No. 10/460,700, entitled "Method and Apparatus for Determination of Network Topology."

Once the endpoints 102 are discovered, they are preferably organized into zones that form a hierarchy. The hierarchy may be constructed so as to reflect geography, topology or any other characteristic useful in a particular application. The endpoints 102 are preferably configured so as be able to handle multiple hierarchies in a concurrent manner. The hierarchies can be manually constructed or they can be automatically generated by the endpoints themselves. For example, the system 100 could start with a Domain Name Service (DNS) hierarchy and adapt that initial hierarchy to the needs of a particular application. In many cases, a hierarchy that is derived from observed QoS data would be beneficial.

In a given hierarchy, every endpoint belongs to a zone and to every superzone of that zone. The zone assignments are preferably made, after the address discovery process has completed, on the basis of user configuration and/or observed QoS data. As part of zone assignment, each zone may be assigned a "leader" to represent it, for the purposes of zone QoS monitoring, reporting and control. Once the zone assignments are made, the endpoints 102 start operating in such a way that the subzones of a zone periodically call each other, meaning that a synthetic call is made between endpoints selected from each of the two subzones.

Figures 5, 6:
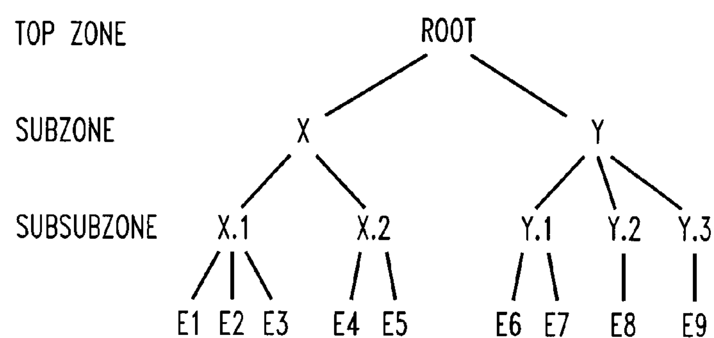
FIG. 5 shows an example of a hierarchical arrangement of endpoint devices in a distributed monitoring and analysis system in accordance with the invention.
FIG. 6 shows an example payload format for an RTP packet in accordance with the invention.

FIG. 5 shows an example of a hierarchy of endpoints in accordance with the invention. The top zone is defined as the root of a tree, and includes subzones denoted X and Y, which include respective "subsubzones" X.1, X.2 and Y.1, Y.2, Y.3, respectively. Each of the subsubzones is associated with one or more endpoints in a set of endpoints denoted E1 through E9, as indicated in the figure. Of course, the particular number of zones, subzones, subsubzones, endpoints per zone, number of hierarchy levels and other aspects of the FIG. 5 hierarchy are illustrative only, and numerous other arrangements are possible.

In the FIG. 5 example, the hierarchy would require calls to be placed from X to Y, from X.1 to X.2, from Y.1 to Y.2, from Y.1 to Y.3 and from Y.2 to Y.3

More than one endpoint can be selected for the task of placing calls between two subzones, and there a number of mechanisms by which such coverage may be obtained. For example, a random bottom up approach may be used in which an endpoint decides whether or not to place a call and to where in a random fashion. In the FIG. 5 example, endpoint E1 may periodically select one of the endpoints E2 to E9 at random to which to place a call.

Another possible approach is a limited random top down approach in which zone leaders recursively descend the zone hierarchy through the zone leaders, preventing excessive bandwidth usage and protecting network resources at each step of the way in an otherwise random endpoint selection scheme. Referring to the FIG. 5 example, the root node would ask zone leaders X and Y to pick an endpoint to test X to Y. The X zone leader might select the X.1 subzone at random and/or on the basis of system resources and forward to it the task of choosing. The zone leader X.1 might select E2. Similarly, the Y zone leader may have selected E9, resulting in the endpoint pair E2, E9 being used to test X to Y.

Other mechanisms can be used to select the endpoints that are used to evaluate the subzone to subzone network QoS. The mechanism selected for an application would depend on the circumstances. For example, the random bottom up approach can be used to produce realistic network conditions while the limited random top down approach can be used to control tightly the amount and the location of the test data traffic injected on a network.

As indicated previously, a given synthetic call from an endpoint A to an endpoint B generally comprises a sequence of packets going from A to B and back to A. As the packets travel, they may be dropped by the network. In the illustrative embodiment, as A sends a packet i to B, A writes the departure time $S_i$ from A in the packet itself. When B receives the packet, it writes the arrival time $U_i$ in the packet. B immediately sends the packet back to A, writing the departure time $V_i$ from B in the packet. When A receives the packet, it writes the arrival time $T_i$ in the packet. The result is the four timestamps $S_i$ $U_i$ $V_i$ $T_i$ from which one-way delay and jitter measurements are derived.

The two endpoints A and B also preferably each store a bit array indicating which packet was received. The bit array on B is sent to A with every packet. This is in addition to the above-noted timestamps that are also traveling with the packets. The bit array is sent from B to A so that A can determine the number and pattern of packet loss in each of the two directions separately. Endpoint A ends up with a sequence of timestamps with gaps corresponding to packets lost in either direction as well as a pair of bit arrays describing which packet(s) were lost in which direction.

In addition to this network QoS data, the endpoints set the record route field of the IP header in order to collect Layer 3 route information for each packet. Not all routers in the network honor that request and there is enough space in the IP header for at most nine Layer 3 hops. Endpoint B retrieves this recorded route information from the IP header and stores it in the packet payload for the trip back to A. Thus, packets that return to A contain information characterizing both the forward route and the reverse route.

Although the illustrative embodiment generates test communications comprising RTP packet data streams that resemble VoIP traffic, this is by way of example only. Other embodiments can send other types of data traffic using other control mechanisms, such as those used in connection establishment. Moreover, the invention does not require the use of test communications, and actual call traffic or other types of communications can be used in alternative embodiments.

All of the traffic generation facilities may be fully automated and can be scripted, using XML or other suitable scripting language, in order to describe the type of testing, traffic, control or other parameter(s) to be used.

Scripting is useful because it may be difficult in certain applications to predict in advance the particular test configuration that will be of greatest benefit. Therefore, the scripting aspect of the present invention provides an environment in which a user can create a scripted test program that is carried out by the endpoints. Such programs can be arbitrarily complex and can be used to generate measurement data characterizing any number of different performance aspects of the network. As one example, assume that for a given network it is deemed that performance in File Transfer Protocol (FTP) retrieval of a message file is crucial. Using the techniques of the invention, a user can create a scripted test program which specifies the test parameters and the desired measurement data, and the program may be provided to the appropriate endpoints. The test may then be performed "on the fly" as needed. Example scripted test program pseudocode in the Send/Expect style for an FTP transaction is as follows.

```
#comment
CONNECT hostname FTPPORT
#to login
SEND FTPPORT username
EXPECT FTPPORT "331"
SEND FTPPORT password
EXPECT FTPPORT "200"
#send a show a list files command
CREATE SERVER SOCKET LOCALPORT
SEND FTPPORT "PORT MYADDRESS LOCALPORT"
EXPECT FTPPORT "OK"
SEND FTPPORT "LIST"
```

-continued

```
EXPECT FTPPORT "OK"
#Get a list of files on the data port
EXPECT LOCALPORT "#####"
CLOSE LOCALPORT
SEND FTPPORT "QUIT"
CLOSE FTPPORT
```

Of course, numerous other types of scripting may be used to generate test programs executable by a distributed monitoring and analysis system as described herein.

FIG. 6 illustrates an example payload format for an RTP packet in a test communication of the illustrative embodiment.

The "sessionid" field is a key that uniquely identifies a given call.

The "seq" field identifies the sequence number of this packet within the call.

The "bitmap" field provides the above-described bit map, where the value of bit i indicates whether the packet with sequence number i was lost (0) or received (1) by endpoint B.

The fields s, u, and v denote the respective $S_i$, $U_i$ and $V_i$ timestamps previously described.

The "pathlen" field denotes the number of routers on the path from endpoint A to endpoint B that recorded their IP address in the IP header of the packet.

The "truepathlen" field denotes the actual length of the path from endpoint A to endpoint B, as opposed to the length as indicated by the pathlen field above. The actual path length is determined based on the time to live (TTL) field of the packet.

The "path" field includes a sequence of IP addresses along the path from endpoint A to endpoint B, one for each router that recorded its IP address in the IP header of the packet.

The "other content" field contains any other data to be transported, such as, for example, a voice or video sample.

The software element of the example endpoint in the illustrative embodiment is also preferably configured to provide data reporting and alarm features. Once a call between an endpoint pair has completed, a corresponding network QoS report summarizing the resulting measurements may be made available via the previously-described web-based user interface. Such a report may include, for example, loss in two directions, delay in two directions, jitter in two directions, loss burst in two directions, and per-packet Layer 3 path record. The particular information reported, to whom it is reported and under what conditions it is reported are entirely configurable. For example, the entire report with all available measurement data can be sent to the zone leader which then integrates all such data into XML or HTML summaries accessible through the web-based user interface using a conventional web browser.

Additionally or alternatively, the data can be inspected for urgent conditions and the endpoint can send a warning message to an operator or to an automated ticketing system.

The endpoint can also report the QoS in a standard way such as by sending a concurrent RTCP stream to a designated monitoring agent.

All of the reporting facilities may be fully automated and can be scripted, using XML or other suitable scripting language, to describe the reporting conditions.

The reporting may be implemented in accordance with a real-time visualization aspect of the invention. In this aspect of the invention, real-time visualization of network topology information including network nodes and edges between the nodes may be displayed. The network nodes may each correspond to an endpoint device. The edges can be colored, in an output display generated by a visualization software tool, to indicate different criteria, such as usage count and delay. In addition, the particular path taken by a given communication can be "flashed" in real time on the display by appropriate coloring of the corresponding edge(s). This system can thus provide real-time display of the passage of individual packets through the network.

Another feature that may be provided in the software element of the example endpoint in the illustrative embodiment is a navigation and analysis feature. For example, zone leaders receiving network QoS reports can use them to generate XML or HTML summaries accessible through the web-based user interface using a web browser. In fact, a user can navigate through the zone leaders for a given hierarchical tree, looking for problems as they arise. Each node of the tree represents the performance between the subzones of a zone and has links to each subzone and to the zones above itself. The XML or HTML summaries may be configured so as to integrate the QoS data together with whatever Layer 3 topology data was collected and to attribute blame to specific areas of the network. A more particular example of such an XML or HTML summary may include color coded matrices showing median and interquartile range for various QoS-related statistics, with rows corresponding to source subzone and columns to destination subzone. Many other summary formats may be used.

A network monitoring and analysis system in accordance with the invention may be configured to autonomously collect performance data for each zone of the above-noted hierarchy. By way of example, network topology information may be collected for each edge, where edges are subzones of a zone corresponding to a router, and for each router. For each such element (e.g., zone, subzone pair, edge), the system may collect and analyzes the data, making the results available in one or more web pages. The system may maintain a collection of Statistical Process Control (SPC) tables used to recognize an out-of-tolerance state (not within adequate specification values, e.g., 80 milliseconds one way delay), an out-of-control state (not within a range of values associated with a predefined in-control state), or other types of states. The state of each element can be reported on a summary web page, through a network visualization tool in the case of the edges of the topology architecture, or using other reporting arrangements. It should be noted that the out-of-control state is not necessarily a negative indicator, but instead simply indicates an unusual condition. The state parameters may evolve over time to take into account natural effects such as time of day or day of week. Such ranges and states may be maintained and reported by the system, and may be utilized in alarm generation.

The present invention also provides an ability to implement interface renaming. For example, when the distributed monitoring and analysis system determines network topology information and a hierarchy based on geography, function, or other characteristic, the interfaces in and out of a router or other network element can be renamed accordingly. A more particular example involving geographical characteristics is as follows. Take an edge between router A and B, in the A-to-B direction. Consider the geographical source and destination of all the packets that went through A and B in that order. The geographical characterization of the A-to-B interface is the greatest common denominator of all of the destinations seen through A and B in that order. More specifically, if the destinations are a.b.c, a.b.d and a.b.c.e, the characterization is a.b. A similar approach may be used for the source to characterize the reverse direction B-to-A. The interface renaming in this example is providing a geographical meaning to what would otherwise be simply an IP address. The performance matrices for the topology architecture provided by the system may thus be configured to show both the IP addresses and the geographical or other characterization of the interfaces.

Advantageously, the present invention in the illustrative embodiment described above allows accurate measurements of jitter, loss, delay and other QoS-related statistics to be determined without the need for a centralized controller. The invention also provides other advantages in terms of making QoS data summaries available to users through a web-based user interface that can be accessed using a conventional web browser.

It should be noted that a distributed monitoring and analysis system can be used to perform a wide variety of tests on a network. In conjunction with the illustrative embodiment, "binary" tests involving a pair of endpoints denoted A and B were described. An example binary test as described above may involve the selection of two subzones of a given zone in the above-described hierarchy, with one endpoint being selected at random from each of the subzones for participation in the binary test. However, the invention can also be used to perform unary tests, that is, tests involving only a single endpoint, as well as other types of tests each involving more than two endpoints. Unary tests, by way of example, can be performed at the zone level in the above-described hierarchy. In such an arrangement, a single endpoint from a given zone may be selected at random and used to perform the unary test. More specific examples of unary tests include DNS testing, in which a selected endpoint measures the amount of time required by a DNS server to perform a name-to-IP conversion, and TCP connection establishment testing, in which the selected endpoint measures the time needed to return from a connect system call.

Many different types of combinations of binary tests, unary tests, and tests involving more than two endpoints can also be performed in a given embodiment of the invention.

A distributed monitoring and analysis system in accordance with the invention can be implemented as part of or in conjunction with an otherwise conventional VoIP analysis tool or other network management system application that is used, for example, to test, diagnose, troubleshoot or design an IP telephony system or other type of network-based communication system. An example of a network management system application is the VMON® system from Avaya Inc. of Basking Ridge, N.J., USA.

As previously noted, one or more of the monitoring and analysis functions described above in conjunction with the illustrative embodiments of the invention may be implemented in whole or in part in software utilizing processor 202 and memory 204 associated with a given endpoint device. Other suitable arrangements of hardware, firmware or software may be used to implement the monitoring and analysis functions of the invention.

It should again be emphasized the above-described embodiments are illustrative only. For example, alternative embodiments may utilize different endpoint device hardware, firmware or software configurations, different data formats for synthesized calls, different types of network traffic, and different communication protocols than those of the illustrative embodiments. In addition, although test communications between a selected pair of endpoints are described in conjunction with the above examples, other arrangements are possible, such as communications with a single endpoint, communications between a given originating endpoint and multiple destination endpoints, etc. These and numerous other alternative embodiments within the scope of the following claims will be apparent to those skilled in the art.

APPENDIX 1

```
# © 2003 Avaya Inc.
# start or rho_hat relevant functions
#
def cmp0(a,b):
  if a[0]<b[0]: return -1
  if a[0]>b[0]: return 1
  return 0
def line(p1,p2):
  x1,y1=p1
  x2,y2=p2
  m=float(y2-y1)/(x2-x1)
  return m,y1-x1*m
def below(line,p):
  m,b=line
  x,y=p
  return y<b+m*x
def above(line,p):
  m,b=line
  x,y=p
  return y>b+m*x
def make_envelope(ps,testfun):
  n=len(ps)
  i=0
  envelope_points=[ps[i]]
  while i<(n-1):
    j=i+1
    while 1:
      if j>=(n-1): break
      ijline=line(ps[i],ps[j])
      k=j+1
      ok=1
      while k<n:
        if not testfun(ijline,ps[k]):
          ok=0
          break
        k=k+1
      if ok: break
      j=k
    i=j
    envelope_points.append(ps[i])
  return envelope_points
def find_supporting_line(lo,hi,fun1,fun2):
  i=0
  while i<len(lo):
    j=0
    while j<len(hi):
      ijline=line(lo[i],hi[j])
      ok=1
      if ok:
        for k in range(len(lo)):
          if k==i: continue
          if not fun1(ijline,lo[k]):
            ok=0
            break
      if ok:
        for k in range(len(hi)):
          if k==j: continue
          if not fun2(ijline,hi[k]):
            ok=0
            break
      if ok:
        break
      j=j+1
    if ok: break
    i=i+1
  #
  #
  #
  if ok: return ijline
  return None
def rho_hat(ts):
```

APPENDIX 1-continued

```
  #
  # get sequences
  #
  ums=[ ]
  vmt=[ ]
  for i in range(len(ts)):
    s,u,v,t=ts[i]['s'],ts[i]['u'],ts[i]['v'],ts[i]['t']
    if u==None or v==None or s==None or t==None: continue
    ums.append((s,u-s))
    vmt.append((t,v-t))
  ums.sort(cmp0)
  vmt.sort(cmp0)
  #
  # derive the lower envelope
  #
  envelope_lo_points=make_envelope(vmt,below)
  print envelope_lo_points
  envelope_hi_points=make_envelope(ums,above)
  print envelope_hi_points
  #
  # search for one in between
  #
  line_up=find_supporting_line(envelope_lo_points,envelope_
  hi_points,below,above)
  line_down=find_supporting_line(envelope_hi_points,envelope_
  lo_points,above,below)
  return line_up[0],line_down[0]
#
# end of rho_hat relevant functions
#
def delta_hat(ts,rho):
  seqs=ts.keys( )
  seqs.sort( )
  dmin=dmax=None
  for i in seqs:
    s,u,v,t=ts[i]['s'],ts[i]['u'],ts[i]['v'],ts[i]['t']
    if u==None or v==None or s==None or t==None: continue
    dimax=v-(1+rho)*t
    dimin=u-(1+rho)*s
    if dmax==None or dimax>dmax: dmax=dimax
    if dmin==None or dimin<dmin: dmin=dimin
  return dmax,dmin
#
# fixts adjusts the time on the st endpoint (uv is assumed perfect)
#
def fixts(ts,rho,delta):
  TS={ }
  seqs=ts.keys( )
  seqs.sort( )
  #
  # translate all timestamps
  #
  for i in seqs:
    s,u,v,t=ts[i]['s'],ts[i]['u'],ts[i]['v'],ts[i]['t']
    S=s
    T=t
    if s!=None: S=delta+(1+rho)*s
    if t!=None: T=delta+(1+rho)*t
    U=u
    V=v
    TS[i]={'s':S,'u':U,'v':V,'t':T}
  #
  # done
  #
  return TS
```

What is claimed is:

1. An apparatus for use in a network-based communication system, the apparatus comprising:

a first endpoint device configurable for operation with at least a second endpoint device;

the first and second endpoint devices being part of a plurality of endpoint devices collectively implementing a distributed monitoring and analysis system wherein the plurality of endpoint devices are organized into a hierarchy comprising a plurality of zones;

the distributed monitoring and analysis system being configured to process measurements based on communications between respective pairs of endpoints to provide summary information regarding inter-zone communication performance.

2. The apparatus of claim 1 wherein a given one of the communications is directed from one of the first and second endpoint devices to the other of the first and second endpoint devices.

3. The apparatus of claim 1 wherein each of the first and second endpoint devices has associated therewith a corresponding distributed test unit.

4. The apparatus of claim 3 wherein at least one of the distributed test units is implemented within its associated endpoint device.

5. The apparatus of claim 3 wherein at least one of the distributed test units is implemented as an external unit coupled to its associated endpoint device.

6. The apparatus of claim 3 wherein at least one of the distributed test units comprises a processor coupled to a memory.

7. An apparatus for use in a network-based communication system, the apparatus comprising:

a first endpoint device configurable for operation with at least a second endpoint device;

the first and second endpoint devices being two of a plurality of endpoint devices collectively implementing a distributed monitoring and analysis system in which a communication is directed to at least one of the endpoint devices and one or more measurements are made based on the communication;

wherein the distributed monitoring and analysis system does not require a centralized controller;

wherein each of the first and second endpoint devices has associated therewith a corresponding distributed test unit; and wherein at least one of the distributed test units is configured to support a web-based user interface providing access to measurement data associated with the one or more measurements.

8. The apparatus of claim 1 wherein a given one of the communications comprises a Real-Time Transport Protocol (RTP) data packet encapsulated within an Internet Protocol (IP) packet.

9. The apparatus of claim 2 wherein the communication is sent from the first endpoint device to the second endpoint device, and returned from the second endpoint device back to the first endpoint device.

10. The apparatus of claim 9 wherein the first and second endpoint devices each record timestamp information associated with sending and receiving of the communication.

11. The apparatus of claim 10 wherein each of the first and second endpoint devices is configured to record the timestamp information associated with sending and receiving of the communication at points in time corresponding substantially to times of respective transmission and reception of the communication over a connection associated with a network of the system under the control of an operating system kernel of the endpoint device.

12. The apparatus of claim 10 wherein the timestamp information is subject to a post-processing operation which determines an appropriate separation of a round trip time measurement into a pair of one-way measurements without requiring synchronization of clocks associated with the first and second endpoint devices.

13. The apparatus of claim 10 wherein the timestamp information is processed to generate estimates of offset and drift between internal clocks associated with the first and second endpoint devices.

14. The apparatus of claim 13 wherein the estimates of offset and drift are utilizable to linearly transform timestamps generated using a time scale of one of the first and second endpoint devices to a time scale of the other of the first and second endpoint devices.

15. The apparatus of claim 1 wherein at least a given one of the endpoint devices is operative to implement an address discovery process which permits that endpoint device to locate other endpoint devices configured for participation in the distributed monitoring and analysis system.

16. An apparatus for use in a network-based communication system, the apparatus comprising:

a first endpoint device configurable for operation with at least a second endpoint device;

the first and second endpoint devices being two of a plurality of endpoint devices collectively implementing a distributed monitoring and analysis system in which a communication is directed to at least one of the endpoint devices and one or more measurements are made based on the communication;

wherein the distributed monitoring and analysis system does not require a centralized controller;

wherein at least a given one of the endpoint devices is operative to implement an address discovery process which permits that endpoint device to locate other endpoint devices configured for participation in the distributed monitoring and analysis system; and wherein the address discovery process is operative such that, upon identification of an additional endpoint device configured for participation in the distributed monitoring and analysis system, a remaining search space is partitioned among at least the given endpoint device and the additional endpoint device.

17. The apparatus of claim 16 wherein the search space partitioning operation is repeated each time an additional endpoint device configured for participation in the distributed monitoring and analysis system is identified.

18. An apparatus for use in a network-based communication system, the apparatus comprising:

a first endpoint device configurable for operation with at least a second endpoint device;

at least the first and second endpoint devices collectively implementing a distributed monitoring and analysis system in which a communication is directed to at least one of the endpoint devices and one or more measurements are made based on the communication;

wherein the distributed monitoring and analysis system does not require a centralized controller; and wherein the first and second endpoint devices are part of a plurality of endpoint devices organized into a hierarchy comprising a plurality of zones, with each of the plurality of endpoint devices belonging to at least one zone.

19. The apparatus of claim 18 wherein for each of the zones at least one associated endpoint device is designated as a zone leader for controlling the periodic generation of communications between selected endpoint devices that belong to subzones of that zone in the hierarchy.

20. The apparatus of claim 19 wherein the selected endpoint devices are determined utilizing one of a random bottom up approach and a random top down approach.

21. The apparatus of claim 1 being configured to rename one or more network interfaces based on geography, function, or other characteristic associated therewith.

22. An apparatus for use in a network-based communication system, the apparatus comprising:

a first endpoint device configurable for operation with at least a second endpoint device;

the first and second endpoint devices being two of a plurality of endpoint devices collectively implementing a distributed monitoring and analysis system in which a communication is directed to at least one of the endpoint devices and one or more measurements are made based on the communication;

wherein the distributed monitoring and analysis system does not require a centralized controller; and wherein the distributed monitoring and analysis system supports a scripting feature which permits a user-scripted test program to be carried out by one or more of the endpoints.

23. The apparatus of claim 1 being configured to generate a display providing real-time visualization of network topology information based at least in part on the one or more measurements.

24. The apparatus of claim 1 wherein at least one of the endpoint devices comprises a terminal node of the network.

25. The apparatus of claim 1 wherein at least one of the endpoint devices comprises an internal node of the network.

26. A method for use in a network-based communication system comprising a plurality of endpoint devices which implement a distributed monitoring and analysis system, the method comprising the steps of:

organizing the plurality of endpoint devices into a hierarchy comprising a plurality of zones; and configuring the distributed monitoring and analysis system to process measurements based on communications between respective pairs of endpoints to provide summary information regarding inter-zone communication performance.

27. An article of manufacture comprising a machine-readable storage medium containing software code for use in a network-based communication system comprising a plurality of endpoint devices which implement a distributed monitoring and analysis system, wherein the software code when executed implements the steps of:

organizing the plurality of endpoint devices into a hierarchy comprising a plurality of zones; and configuring the distributed monitoring and analysis system to process measurements based on communications between respective pairs of endpoints to provide summary information regarding inter-zone communication performance.

* * * * *